(12) United States Patent
Yoshidome

(10) Patent No.: US 11,290,606 B2
(45) Date of Patent: Mar. 29, 2022

(54) SCANNING SYSTEM WITH AUTOMATIC PAPERCLIP ATTACHER

(71) Applicant: Kyocera Document Solutions Inc., Osaka (JP)

(72) Inventor: Gin Yoshidome, San Ramon, CA (US)

(73) Assignee: Kyocera Document Solutions Inc., Osaka (JP)

( * ) Notice: Subject to any disclaimer, the term of this patent is extended or adjusted under 35 U.S.C. 154(b) by 351 days.

(21) Appl. No.: 16/455,419

(22) Filed: Jun. 27, 2019

(65) Prior Publication Data

US 2020/0412892 A1    Dec. 31, 2020

(51) Int. Cl.
*G06F 3/12* (2006.01)
*G06F 15/00* (2006.01)
*G06K 1/00* (2006.01)
*H04N 1/00* (2006.01)
*B42F 1/02* (2006.01)

(52) U.S. Cl.
CPC ....... *H04N 1/00639* (2013.01); *H04N 1/0057* (2013.01); *H04N 1/0066* (2013.01); *H04N 1/00649* (2013.01); *B42F 1/02* (2013.01)

(58) Field of Classification Search
CPC ............. H04N 1/00639; H04N 1/0057; H04N 1/00649; H04N 1/0066; B42F 1/02; B42F 1/003
See application file for complete search history.

(56) References Cited

U.S. PATENT DOCUMENTS

| 4,946,154 A | 8/1990 | Nakamura | |
|---|---|---|---|
| 2002/0150414 A1* | 10/2002 | Conard-White | .......... B42C 1/12 399/410 |
| 2015/0089788 A1* | 4/2015 | Heeren | ..................... B42B 4/00 29/446 |

* cited by examiner

*Primary Examiner* — Moustapha Diaby
(74) *Attorney, Agent, or Firm* — J-Pat U.S. Patent Legal Services; James Judge

(57) ABSTRACT

A multi-functional scanner for attaching paperclips to a sheaf of papers, which includes a paperclip dispensing system for holding and dispensing paperclips, a paperclip clamping assembly adjacent to the paperclip dispensing system for retrieving paperclips from the paperclip dispensing system, a conveyor belt located adjacent to the paperclip clamping assembly for feeding a sheaf of papers to the paperclip clamping assembly, a control circuit for controlling the paperclip dispensing system, the paperclip clamping assembly, and the conveyor belt, and where the paperclip clamping assembly is configured to attach a paperclip onto the sheaf of papers on the conveyor belt.

18 Claims, 13 Drawing Sheets

SCANNING SYSTEM WITH AUTOMATIC PAPERCLIP ATTACHER

FIELD OF THE INVENTION

The present disclosure relates to a scanning system with a paperclip attachment system to scan and attach paperclips to documents.

BACKGROUND

Currently, when a paperclip is used to hold documents together, a person must manually remove the paperclip from the document in order to process the document. This is particularly burdensome when the document, or plurality of documents, is to be processed in a scanner. When the document is done being processed, re-attaching the papers together with a paperclip can be performed. While attaching a paperclip onto one sheaf or file of papers can be inconvenient, repeating this process hundreds or thousands of times can be very tedious and time consuming.

For example, if a company is digitizing paper records and wishes to scan thousands of documents and files, it can cost substantial amounts of time and money to manually attach paperclips to the files and papers after scanning. Automating the paperclip attachment process could greatly increase the efficiency and throughput of digitizing documents with a scanner.

Previous attempts at automating the paperclip attachment process have been made. For example, as shown in FIGS. 1, 2A, and 2B, a known automated paperclip attaching system 1 attempts to paperclip together sheaf of papers 30. Several problems were found to exist with this type of system. Specifically, the edge of the sheaf of papers 30 must be bent in order to attach the paperclip. This can lead to an unwanted crease in the papers to be paperclipped.

Another problem found to exist with the paperclip attaching system 1 was that a special paperclip 3 that has a bent edge, as shown in FIG. 2B, needed to be used. Further, only sheaves of papers that could fit between this bent edge portion and the inner loop could be paperclipped together. This unnecessarily limited the number of papers that could be paperclipped together. Among other drawbacks, jamming was also found to be a problem with the paperclip attaching system 1.

SUMMARY

It is noted that this description refers to scanner, but other devices such as a printer, copy machine, or combination thereof, suitable for use in either a home or office, may be used.

In an embodiment of the disclosure, a paperclip attachment system, which can optionally be part of a scanner, can attach paperclips to a sheaf of papers. This paperclip attachment system can include a paperclip dispensing system for holding and dispensing paperclips, a paperclip clamping assembly adjacent to the paperclip dispensing system for retrieving paperclips from the paperclip dispensing system, a conveyor belt located adjacent to the paperclip clamping assembly for feeding a sheaf of papers to the paperclip clamping assembly, a control circuit for controlling the paperclip dispensing system, the paperclip clamping assembly, and the conveyor belt, and wherein the paperclip clamping assembly is configured to attach a paperclip onto the sheaf of papers on the conveyor belt.

BRIEF DESCRIPTION OF THE DRAWINGS

The following drawings illustrate examples of various components of embodiments of the disclosure disclosed herein and are for illustrative purposes only.

DETAILED DESCRIPTION

The inventor has created a method and apparatus for quickly binding documents together with a paperclip. In one embodiment, a sheaf of papers to be attached by a paperclip is moved into position for attaching a paperclip. The sheaf of paper is then held in place by a push-down bar to apply pressure onto the sheaf from both the top and bottom surfaces. Meanwhile, a clamp can retrieve a stored paperclip from a paperclip dispenser. The clamp, with the paperclip, can then move into position to attach the paperclip in the desired location on the sheaf of papers. The clamp will then move an outer edge of the paper clip to underneath the sheaf of papers and lift the other portion of the paper clip upwards, to open the paper clip. Subsequently, the clamping portion of the clamp will open, and a pusher will extend to push the paperclip into its final position, binding the sheaf of papers. Subsequently, the push-down bar will retract and the sheaf of papers can be moved to the next processing step. The details of several embodiments of the disclosure will be described below.

The figures are not necessarily shown to scale and some features may be shown larger or smaller than they are with respect to other features, in order to facilitate their explanation.

Figure 1:
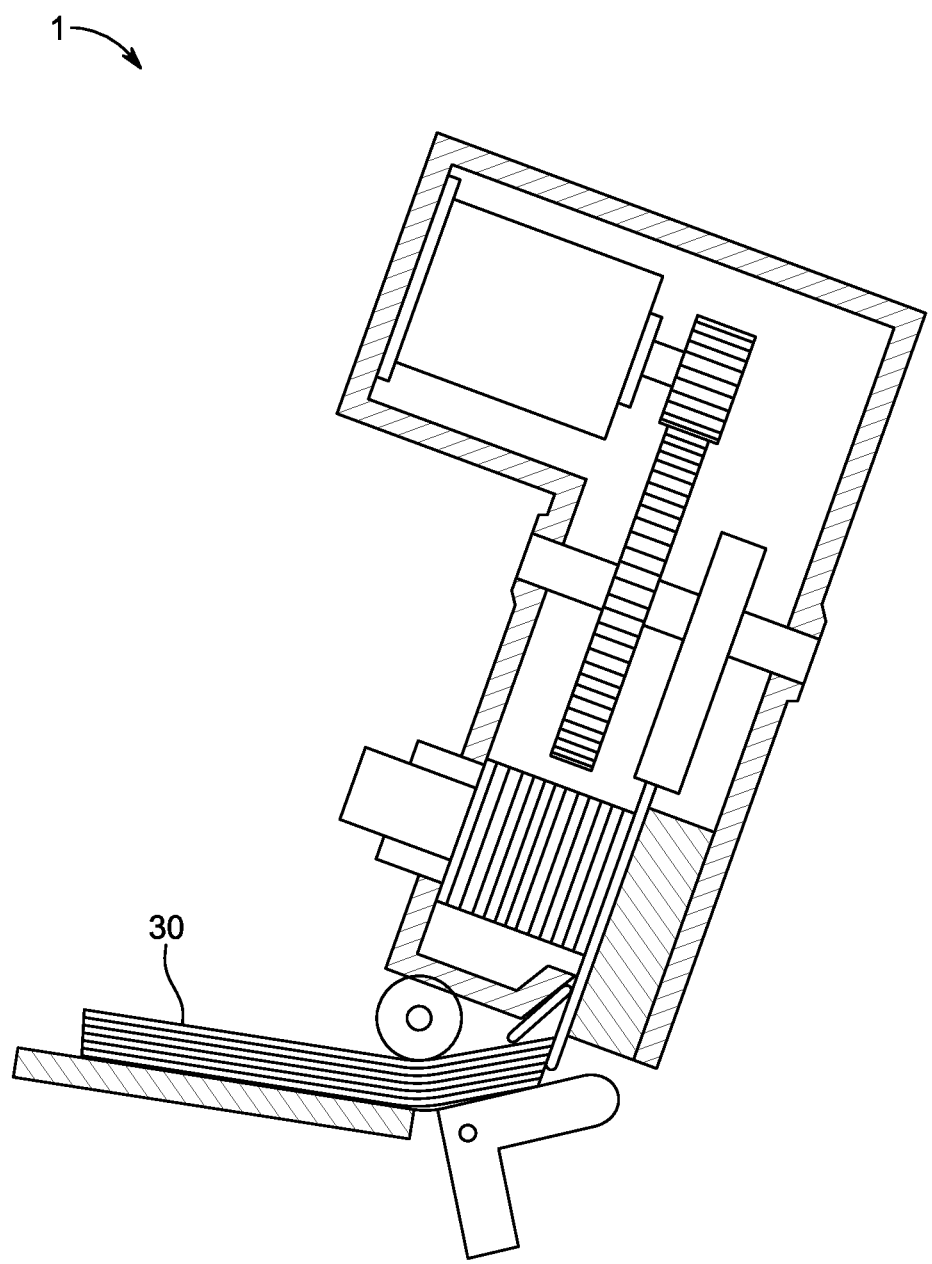
FIG. 1 shows a side view of a known paperclip attachment device.
Figure 2A:
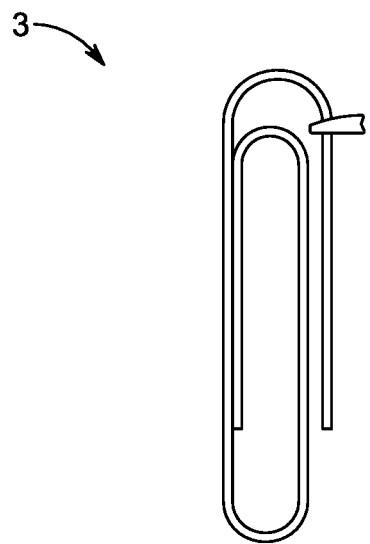
FIG. 2A shows a plan view of a known paperclip.
Figure 2B:
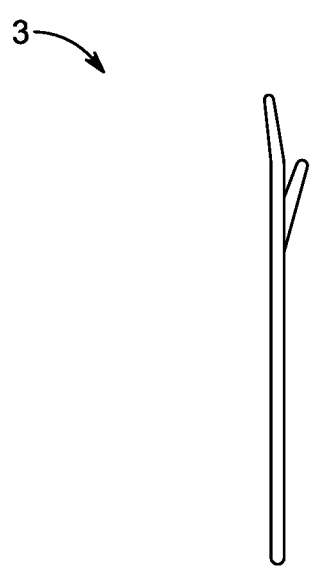
FIG. 2B shows a side view of a known paperclip.
Figure 3:
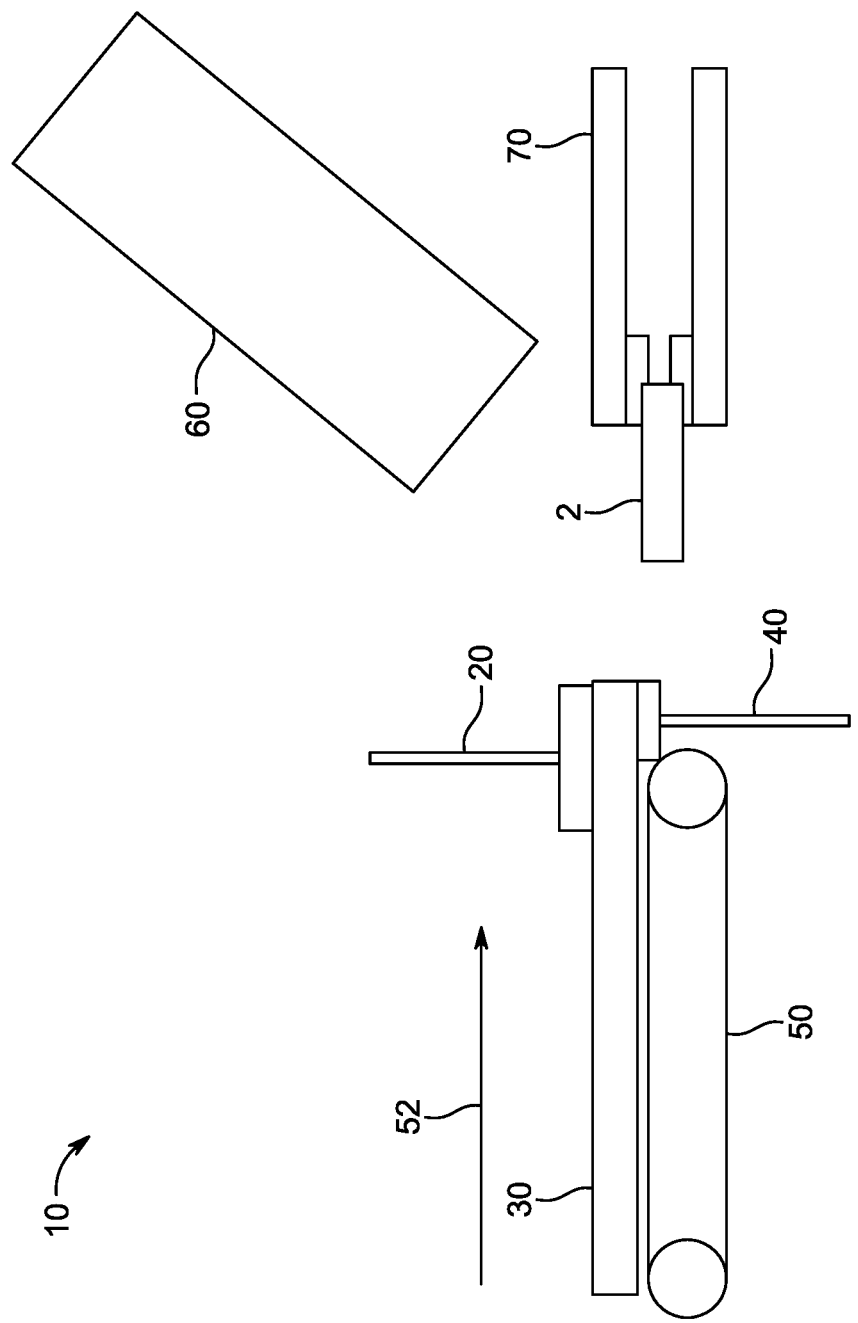
FIG. 3 shows a paperclip attachment system according to a first embodiment.

FIG. 3 shows the side view of a paperclip attachment system 10 according to one embodiment of the disclosure. The system 10 can be internally contained within a scanner, or can be a separate unit in a printing system. For example, the system 10 could be connected to a scanner and could process papers that have been previously processed by the scanner.

Paper sheaf 30 can be loaded onto conveyor belt 50 and can be directly accessed by a human putting a sheaf of papers on it, or can be part of a separate system which loads the sheaf of papers onto the conveyor belt 50. Paper sheaf 30, sheaf of papers 30, or sheaf 30 can be used interchangeably throughout this disclosure to refer to one piece of paper or more than one stacked pieces of paper. Conveyor belt 50 feeds sheaf 30 in direction 52 and into position for paperclip attachment. It is also envisioned that in certain embodiments, paper sheaf 30 may be moved into position by other means including, for example, by direct placement or loading by a different mechanical mechanism.

Paper sheaf 30 could include any paper compatible with and capable of being processed by a scanner. For example, paper sheaf 30 could be comprised of one or more sheets of 8.5×11 inch 20-pound bond weight paper. Similarly, paper sheaf 30 could be comprised of sheets of different sized paper, i.e. 8.5×14 inch, or different weights, i.e. 36-pound bound paper. Paper sheaf 30 could also include an ISO 216 size paper, or any other suitable size or weight of paper.

Paper sheaf 30 is then held in place by push-down bar 20 which descends onto paper sheaf 30, and push-up bar 40 which ascends up to paper sheaf 30. As depicted, push-down bar 20 and push-up bar 40 both include shaft portions that are connected with flat portions at the proximal ends nearest paper sheaf 30. The flat portions include substantially flat surfaces that contact paper sheaf 30. Push-down bar 20 and push-up bar 40 can be moved using an electric motor or solenoid, or other type of movement mechanism (not shown). For example, a motor (not shown) could be located above push-down bar 20 and/or below push-up bar 40 with a corkscrew shaft located within the shaft portions to lower or raise push-down bar 20 or push-up bar 40, respectively.

While the dimensions of push-down bar 20 and push-up bar 40 may vary, the flat portions must be sufficient to support and stabilize sheaf of paper 30. Similarly, push-up bar 40 must be capable of sufficiently supporting and stabilizing paper sheaf 30 throughout the process of paperclip attachment. Thus, the push-up bar 40 is preferably made from a rigid material such as aluminum, steel, plastic, etc.

It is noted that in some embodiments, push up bar 40 can remain stationary and a push-down bar 20 will be used to descend and securely hold the sheaf of paper 30 in place.

In FIG. 3, these components, including push-down bar 20 and push-up bar 40 are vertically oriented, but it is also envisioned that the paperclip attachment system 10, or various components therein, could be oriented differently based on system requirements.

Meanwhile, as will be discussed below, paperclip dispensing system 60 stores paperclips 2 for use in attaching paperclips to sheaf 30. Paperclip 2 could be comprised of any paperclip capable of being processed via a scanner. This could include, for example, paperclips of varying size including types #1-4. Paperclip 2 may be comprised of any material or coating, including metal, vinyl-coated, or plastic. Further, any paperclip that can be spread apart, as shown later in FIG. 7C, can be used.

As will be discussed in detail below, clamp assembly 70 will obtain a paperclip 2 from paperclip dispensing system 60 and move paperclip 2 into the desired position for paperclip attachment.

Figure 4:
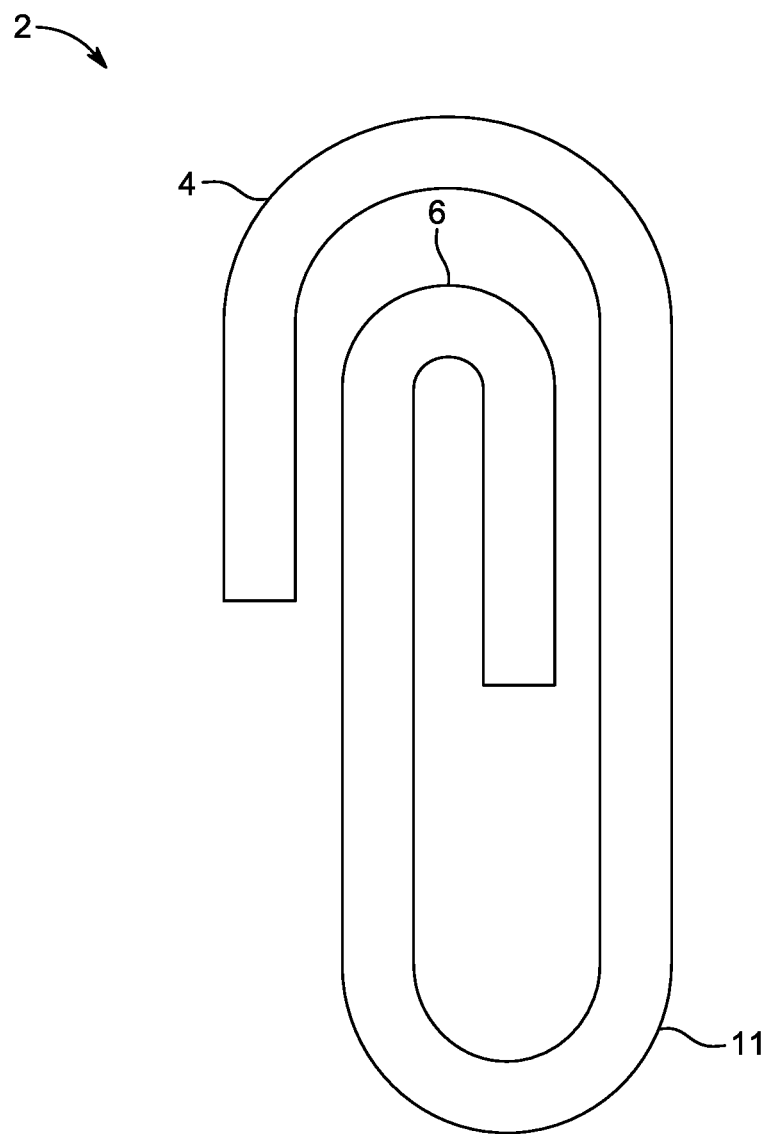
FIG. 4 shows a paperclip that can be used in the paperclip attachment system according to the first embodiment.

FIG. 4 shows an example of a paperclip 2, which contains loops 4, 6 and 11. The exact dimensions and proportions of the paperclip 2 shown in FIG. 4 are not critical and any paperclip with a similar shape and proportions can be used. For example, FIG. 4 shows a Gem-type paperclip. The paperclip 2 could also have ridges to help secure it to the paper, or other features, not shown in FIG. 4.

Figure 5:
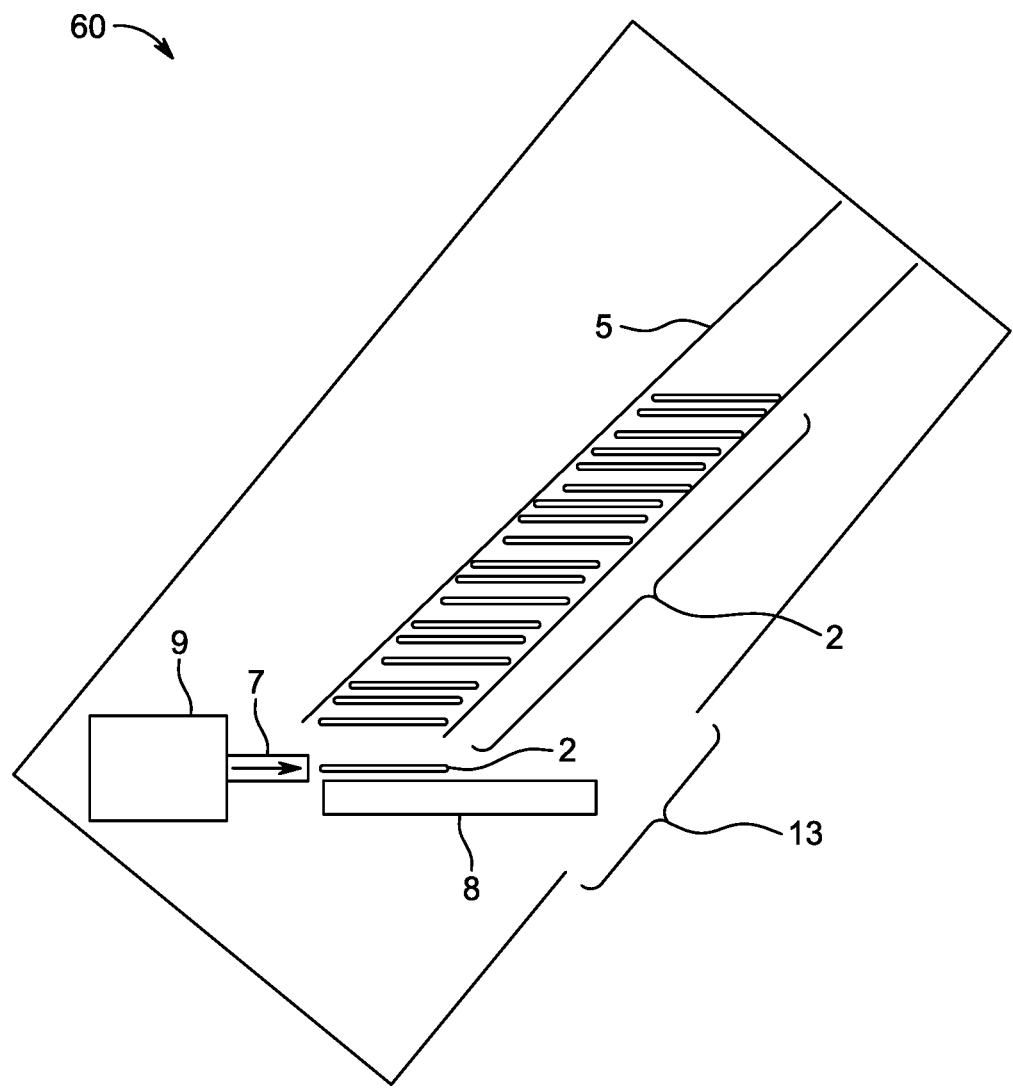
FIG. 5 shows a paperclip dispensing system according to a first embodiment.

FIG. 5 provides an exposed side view of an exemplary paperclip dispensing system 60. From this perspective, paperclip dispensing system 60 can be seen to include paperclip cartridge 5, piston 9 which includes piston rod 7, and paperclip tray 8.

Paperclip cartridge 5 is a holding container for paperclips 2. Paperclips 2 can be vertically or horizontally stacked upon one another and spring loaded into paperclip cartridge 5, so that as one paperclip is dispensed from paperclip cartridge 5, another paperclip is pushed down to replace it. As will be discussed below, paperclips 2 being stored in paperclip cartridge 5 will be dispensed from cartridge 5 for use in paperclip attachment.

As depicted, paperclip cartridge 5 stores stacked paperclips in a generally vertical orientation. Paperclip cartridge 5 is roughly the width of paperclip 2 and is typically arranged vertically in order to store a greater number of paperclips 2, which are stacked upon each other. In this embodiment, paperclip cartridge 5 is positioned at a bias of roughly 30 degree from upright. It is also envisioned, however, that any or all of the paperclip dispensing system 60, paperclip cartridge 5, and/or paperclips 2 may be disposed in a vertical orientation or later oriented as needed for future processing. At the bottom proximal end of paperclip cartridge 5, the bottom-most paperclip 2 in the stack of stored paperclips is near paperclip tray 8 (discussed below). The bottom-most paperclip 2 should be partially exposed from the paperclip cartridge 5 so that the piston rod 7 can contact and push the paperclip 2. As will be discussed below, it is envisioned that the paperclip 2 is oriented in paperclip cartridge 5 such that the first end with loop 11 is nearest to clamp assembly 70 and the second end with loops 4 and 6 is nearest to piston 9.

Each paperclip 2 is dispensed from cartridge 5 by piston 9 extending piston rod 7, which pushes paperclip 2 out of the dispenser. Then, the next bottom-most paperclip 2 will be fed into position for dispensing. This paperclip feeding can be accomplished in a variety of ways. For example, paperclip cartridge 5 could include a (not shown) spring-loaded mechanism at the opposite proximal end of paperclip cartridge 5. The paperclip feeding could also be gravity-feed (not shown), depending on the orientation within the system and the speed at which paperclips are attached.

Piston 9, including piston rod 7, is used to dispense paperclips from cartridge 5. Piston rod 7 extends out of piston 9 and pushes the bottom-most paperclip 2 out of paperclip cartridge 5.

Piston rod 7 must be small enough to selectively push only the bottom-most paperclip 2 from paperclip cartridge 5. The end of piston rod 7 which contacts paperclip 2 may be rectangular and similar in height to the exposed edge of paperclip 2, but may be any shape necessary to comply with system requirements. Piston rod 7, however, must be long enough to push paperclip 2 such that, when extending, it pushes paperclip 2 to a predetermined distance beyond the edge of paperclip tray 8, or as needed by the system for clamp assembly 70 to grab each dispensed paperclip. Additionally, as piston rod 7 must be capable of pushing paperclip 2, it is preferably made from a rigid material such as aluminum, steel, plastic, etc.

Piston 9 must be capable of housing piston rod 7 and also includes a means of driving piston rod 7 toward paper clip 2. Piston rod 7 may be driven by various means including, for example, by a solenoid or pneumatic cylinder, depending on system speed, space, cost, or other constraints. As depicted, piston 9 is rectangular, but it may be any shape necessary to comply with system requirements.

Paperclip tray 8 supports the paperclips 2 that are ejected from paperclip cartridge 5 by piston rod 7. Paperclip tray 8 must be capable of sufficiently supporting and stabilizing paperclips throughout the process of clamp assembly 70 obtaining paperclip 2. Thus, paperclip tray 8 is preferably made from a rigid material such as aluminum, steel, plastic, etc. Preferably, paperclip tray 8 is positioned such that the pitch of paperclip tray 8 is suitable for clamp assembly 70 to clamp paperclip 2 with minimal adjustment from the clamp assembly 70.

In other embodiments, it is envisioned that paperclip tray 8 may be adjustable. For example, paperclip tray 8 may be capable of driving paperclip 2 toward clamp assembly 70. This could be accomplished in several ways, including either a conveyor belt system on paperclip tray 8 or by having paperclip tray 8 be attached to a motor or solenoid, or other type of movement mechanism. In such an embodiment, there may not be a need for piston 9 and piston rod 7.

Additionally, paper clip dispensing system 60 should also include an exposed portion through which paperclips 2 may be dispensed and by which the clamping assembly 70 may retrieve the dispensed paperclips 2. As shown in FIG. 5, paperclip ejection slot 13 is located adjacent to piston rod 7 and provides room for clamp assembly 70 to retrieve a paperclip. It is envisioned that paperclip ejection slot 13 may be slightly larger in height and width than paperclip 2 as pushed by piston rod 7 and gripped by clamping assembly 70. In other embodiments paperclip ejection slot 13 can be as large as the system specifications require as long as it is large enough for the ejected paperclip to pass through.

Additionally, while all of these elements are discussed as components within paperclip dispensing system 60, depending on the system requirements, it is envisioned that one or more of these components may be independently located within the system.

Figure 6:
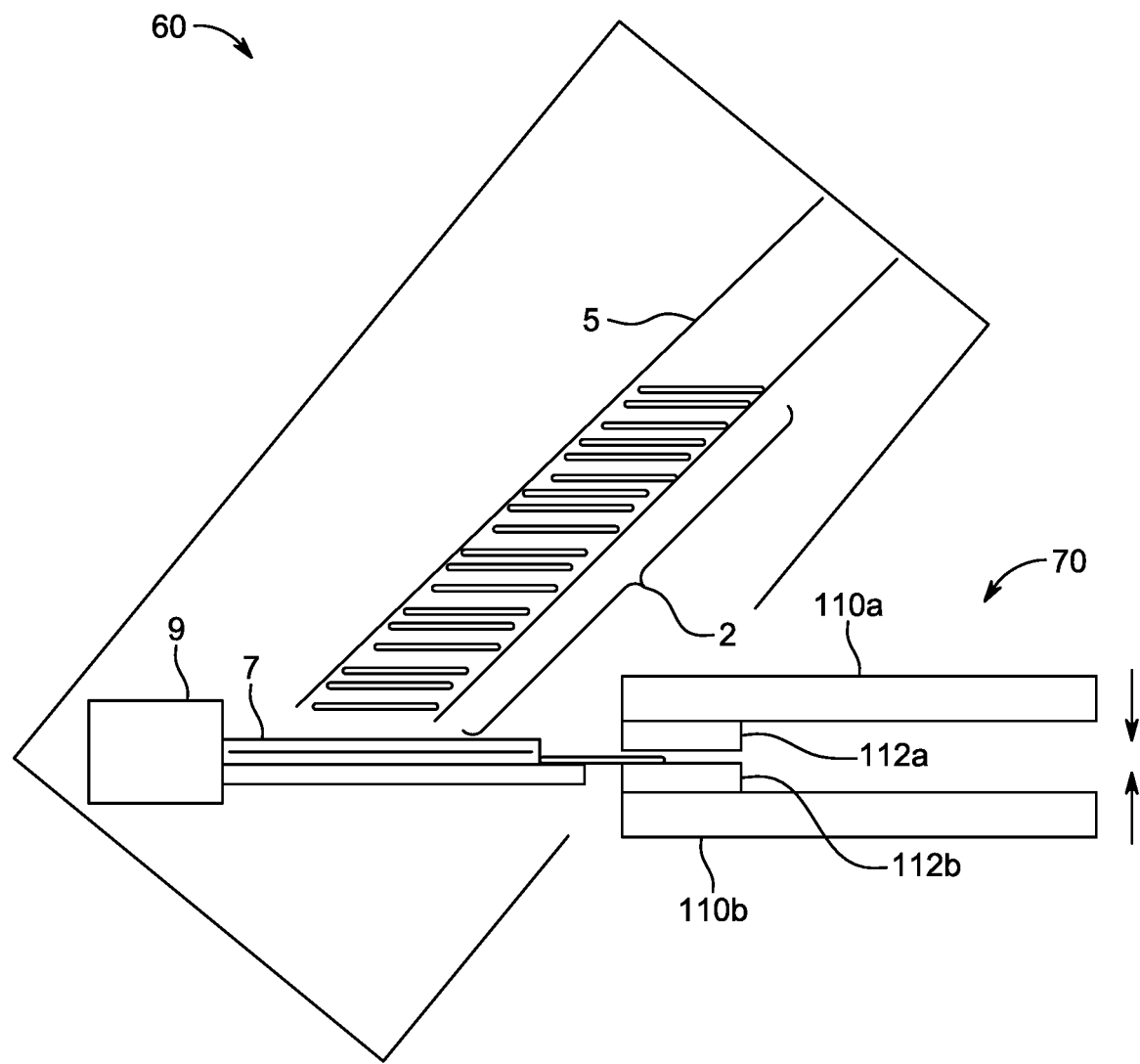
FIG. 6 shows a paperclip dispensing system and paperclip clamping assembly according to a first embodiment.

FIG. 6 provides an exposed side view of an exemplary paperclip dispensing system 60, along with clamp assembly 70. From this perspective it can be seen that clamp assembly 70 includes arms 110*a* and 110*b* as well as grippers 112*a* and 112*b*.

As depicted, arms 110*a* and 110*b* are parallel rectangular prisms, though it is envisioned that, in other embodiments, they may be designed as needed to accommodate the system requirements. Additionally, arms 110*a* and 110*b* must be capable of sufficiently supporting and stabilizing grippers 112*a* and 112*b* as well as paperclip 2 throughout the process of paperclip attachment and therefore are preferably made from a rigid material such as aluminum, steel, plastic, etc.

As depicted, grippers 112*a* and 112*b* are also parallel rectangular prisms though it is envisioned that, in other embodiments, they may be designed as needed to accommodate the system requirements. Grippers 112*a* and 112*b* are rigidly attached to a proximal end of the arms 110*a* and 110*b* respectively. As with arms 110*a* and 110*b*, grippers 112*a* and 112*b* must be capable of sufficiently supporting paperclip 2 throughout the process of paperclip attachment. To accomplish this, grippers 112*a* and 112*b* may be made from a rigid material such as aluminum, steel, plastic, etc., though it is also envisioned that they made be comprised of a rubber or foam, or any suitable material for gripping a paperclip.

To obtain a paperclip 2, clamp assembly 70 moves toward paper clip dispensing system 60. This may be accomplished in several ways, including using a motorized track, or solenoid, or other type of movement mechanism. Once in position, arms 110*a* and 110*b* open (or remain open), which thereby also separates grippers 112*a* and 112*b*. This movement may also be accomplished in several ways, including by a motor or solenoid, or other type of movement mechanism. Once sufficiently separated to fit a paper clip 2 between grippers 112*a* and 112*b*, clamp assembly 70 moves toward the dispensed paperclip 2 until a portion of ejected paperclip 2 is located between grippers 112*a* and 112*b*. Once in position, arms 110*a* and 110*b*, including grippers 112*a* and 112*b*, move closer together until grippers 112*a* and 112*b* contact either side of ejected paperclip 2 such that the dispensed paperclip 2 is clamped between grippers 112*a* and 112*b*. Subsequently, clamp assembly 70 moves dispensed paperclip 2 to the next stage of paperclip attachment.

As discussed above, based on the orientation in paperclip cartridge 5, clamp assembly 70 grips onto loop 11 of the first end of paperclip 2.

Clamp assembly 70 may obtain a paperclip 2 after the paperclip attachment process is initiated or may pre-load a paperclip 2, depending on system specifications.

It is also envisioned that clamp assembly 70 may be designed as needed by system requirements, as long as it is capable of obtaining and holding a paperclip 2 from paperclip cartridge 5. For example, clamp assembly 70 may be comprised of rigid and rounded grippers.

Additionally, the clamp assembly may be controlled by a control circuit 1500 as will be discussed below.

While the preceding describes certain embodiments of the disclosure, it is also envisioned that other forms of the paperclip dispensing may be utilized. For example, paperclips 2 may be stored in a container and selected by a gripping means. Similarly, Paperclips 2 may be dropped from a holding container directly onto a paperclip holding tray.

FIGS. 7A-7F depict the process of attaching paperclip 2 to the sheaf of papers 30 following clamp assembly 70 obtaining a paperclip and sheaf of papers 30 being positioned for paperclip attachment.

Figure 7A:
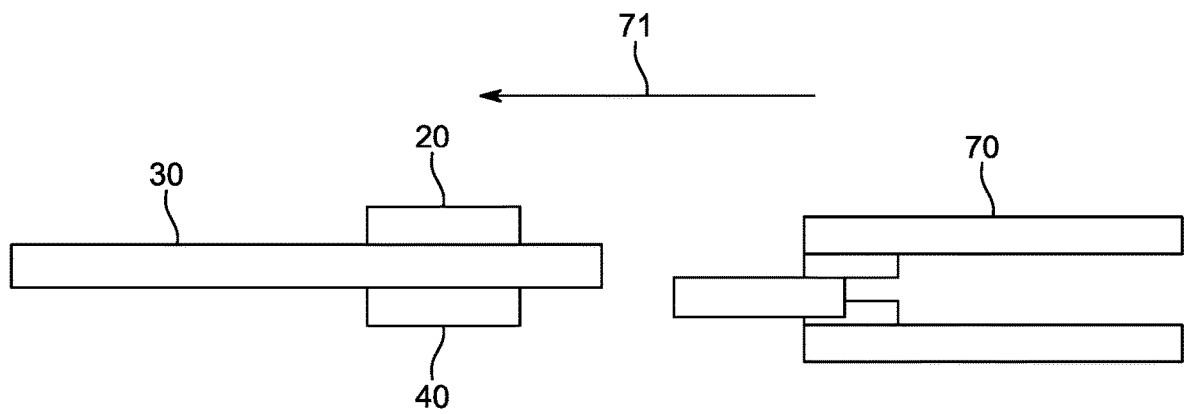
FIGS. 7A-7F show the paperclip dispensing system attaching a paperclip to a sheaf of papers according to a first embodiment.

In FIG. 7A, clamp assembly 70 moves in direction 71 with the exposed portion of paperclip 2, loops 4 and 6 facing the direction of movement 71. Meanwhile, sheaf of papers 30 is held in position by push-down bar 20 and push-up bar 40. (Conveyor belt 50 is not shown in FIGS. 7A-7F.).

Figure 7B:
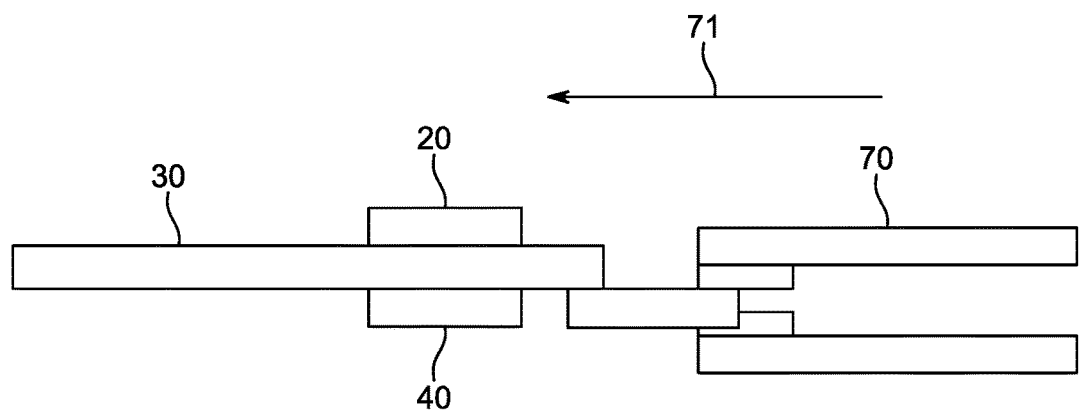

In FIG. 7B, clamp assembly 70 has moved further in direction 71 until paperclip 2 is near the bottom side of sheaf of papers 30. Specifically, loop 4 of paperclip 2 should be located underneath sheaf 30, while loop 6 of paperclip 2 should not be underneath sheaf 30. This is so that when the paperclip 2 is moved upwards, loop 6 will not catch on sheaf 30.

Figure 7C:
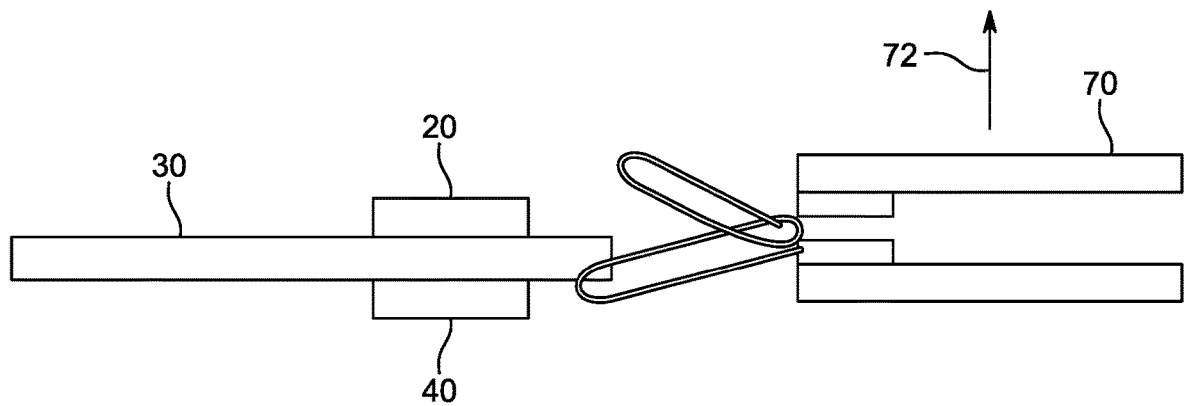
Figure 8:
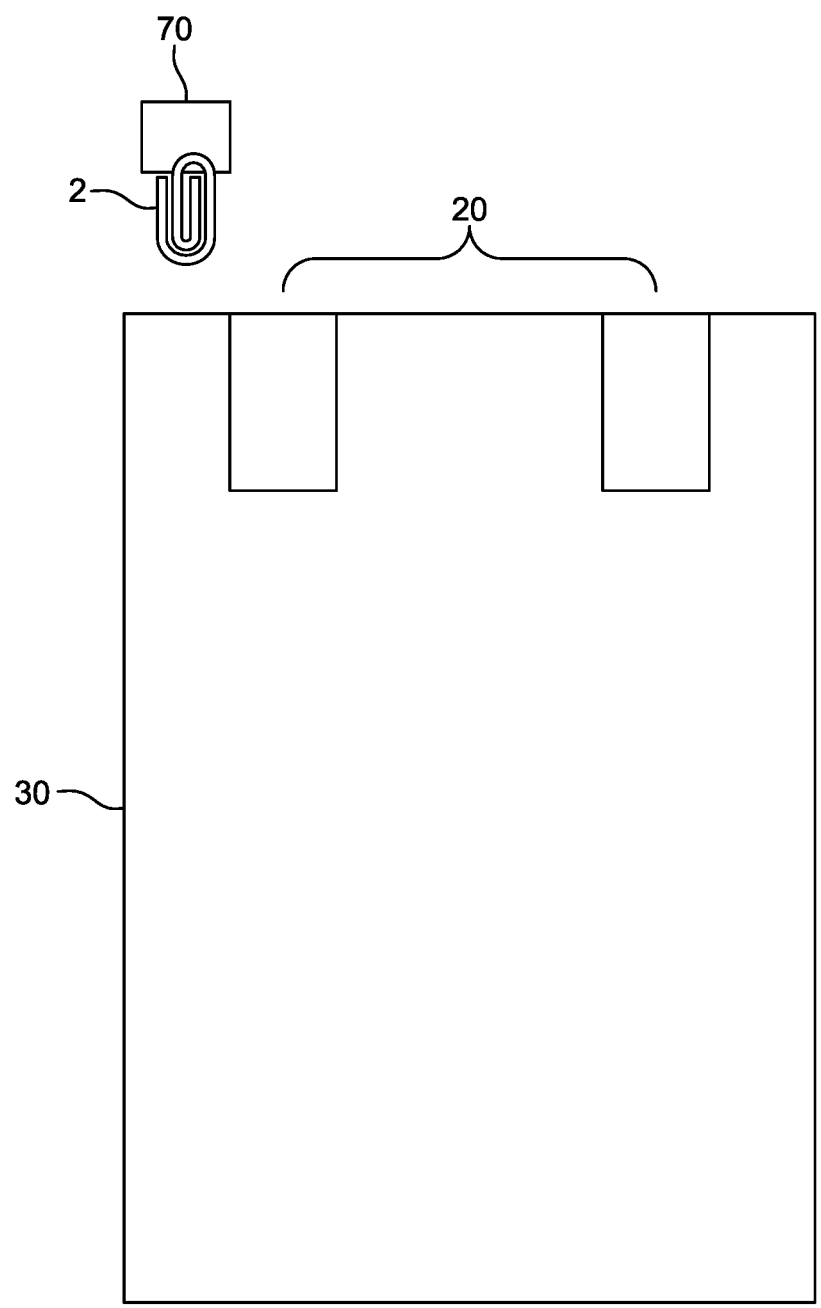
FIG. 8 shows a top plan view of the paperclip attachment system according to a first embodiment.

In FIG. 7C, clamp assembly 70 moves the paperclip 2 in an upwards direction 72, thereby opening paperclip 2. As shown in FIG. 7A, sheaf 30 extends past the push down bar 20 and push up bar 40 to allow loop 4 to make contact with the sheaf 30. However, this is not required and as long as the location of where the paperclip 2 will be attached to the sheaf 30 is free from the push-down bar 20 and push-up bar 40, as shown in FIG. 8.

Figure 7D:
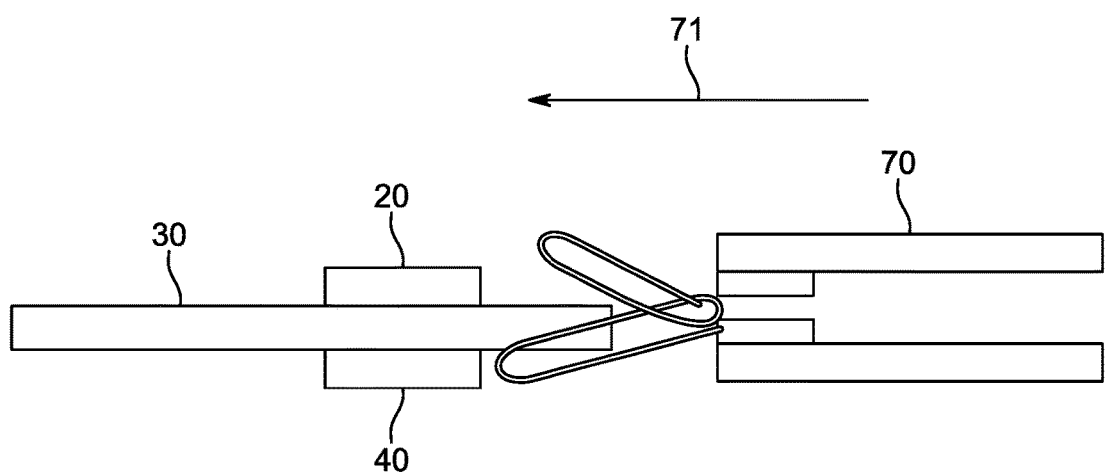

In FIG. 7D, clamp assembly 70 is moved forward in direction 71, while the paperclip 2 is held in an open position. This helps to start attachment of the paperclip 2 to sheaf 30.

Figure 7E:
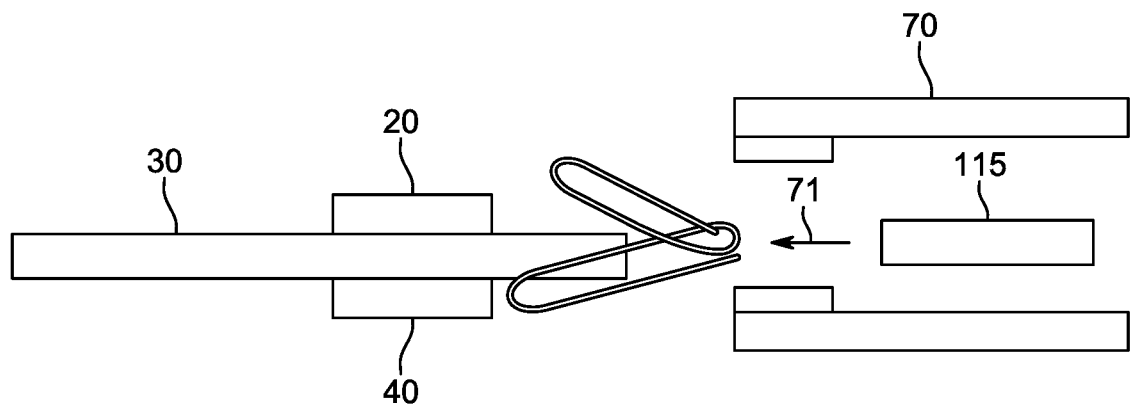

In. FIG. 7E, paperclip 2 is shown partially attached to sheaf 30. At this point, clamping assembly 70 can open and release its grip on paperclip 2, as the paperclip 2 is partially attached to sheaf 30. Pusher 115 will extend in direction 71 to push paperclip 2 into its final position binding the sheaf of paper 30. Pusher 115 is similar to piston rod 7 and is housed in a piston housing (not shown).

Figure 7F:
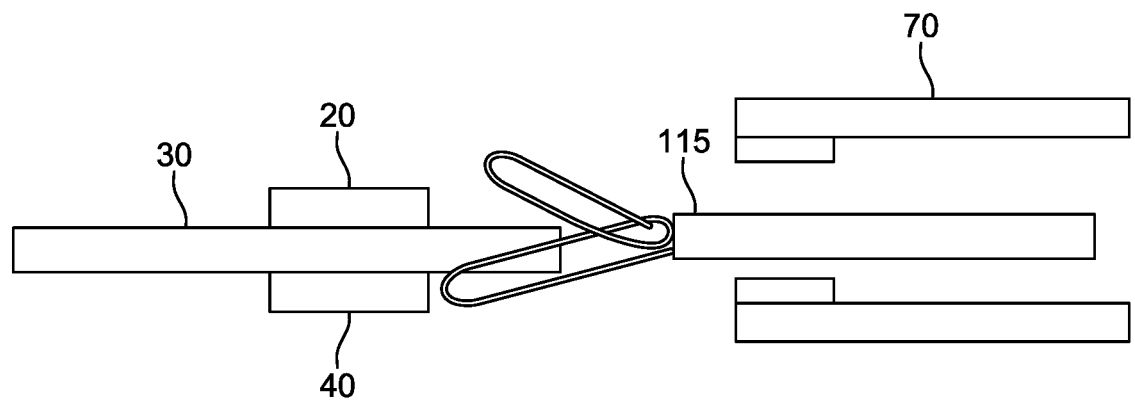

In FIG. 7F, pusher 115 has extended to its final position, binding sheaf of paper 30. Pusher 115 can be stopped at its final position based on a variety of methods. For example, pusher 115 could be stopped at a predetermined distance, calculated based on the size of paperclip 2, by a mechanical stop. Similarly, this can be accomplished through an optical sensor 67 (e.g. a camera), together with image recognition software executed by the control circuit 1500. For example, a neural network could be used to determine if and where a paperclip is located on the sheaf of papers to indicate whether pusher 115 has reached its final position binding the sheaf of paper 30.

After paperclip 2 is clamped onto paper sheaf 30, pusher 115 is retracted to its original location. Subsequently, clamp assembly 70 returns to its original location and/or returns to paperclip dispensing system 60 to obtain another paperclip 2 for future attachment.

Meanwhile, paper sheaf 30, now bound by paperclip 2, is delivered to the next step in processing. This can be accomplished via conveyor belt 50 or other means. For example, paper sheaf 30 could also be loaded onto a set of rollers (not shown). Alternatively, paper sheaf 30 could be either lifted by a paper lifting tray or selected by a separate paper clamping mechanism and moved to the next position for processing or completion.

FIG. 8 shows a top plan view of the paperclip attachment system 10. As shown in FIG. 8, clamping assembly 70 is holding onto paperclip 2 and is near attaching the paperclip 2 adjacent to the push-down bar 20.

Figure 9:
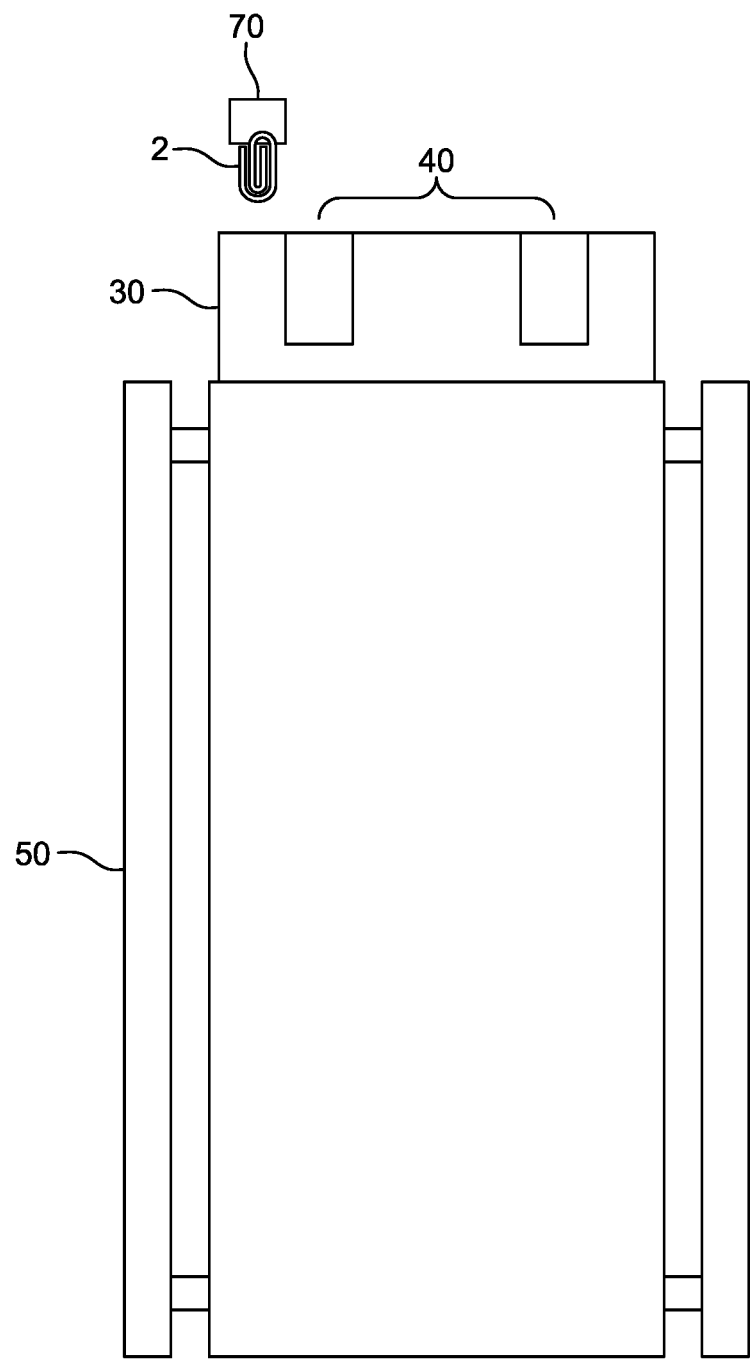
FIG. 9 shows a bottom plan view of the paperclip attachment system according to a first embodiment.

FIG. 9 shows a bottom plan view of the paperclip attachment system 10, with a view of conveyor belt 50 and push-up bar 40.

Figure 10:
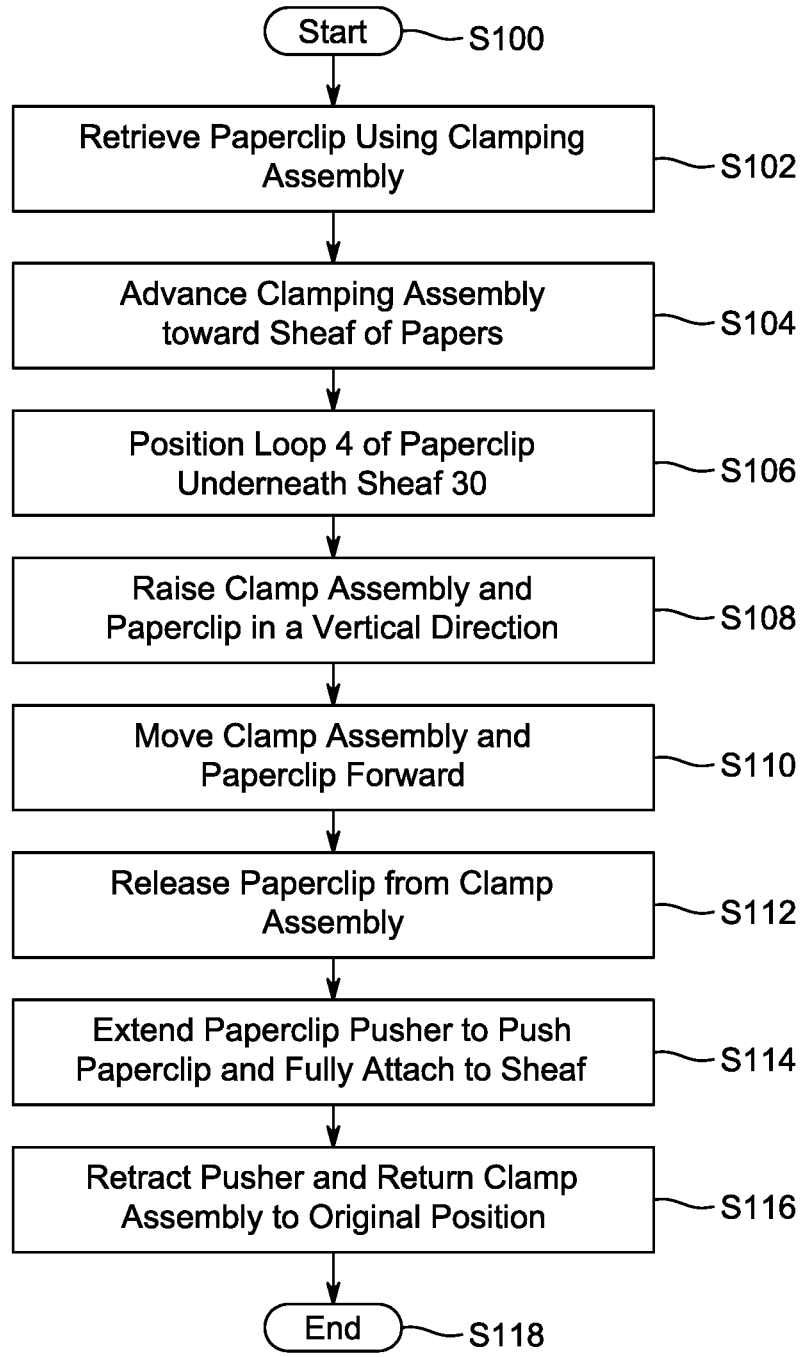
FIG. 10 shows a flowchart of the paperclip attachment system according to a first embodiment of the disclosure.

FIG. 10 is a flowchart of a paperclip attachment process according to a first embodiment of the disclosure. The process starts at step 100 and in step 102, the clamping assembly 70 can retrieve a paperclip from the paperclip dispensing system 60. In step 104, the clamping assembly 70, with the paperclip 2, is advanced toward the sheaf 30. The sheaf 30 is located on the conveyor belt 50 and secured by push-up bar 40 and push-down bar 20. Next, in step 106, the loop 4 of paperclip 2 is positioned underneath the sheaf 30, while the loop 6 remains not underneath the sheaf 30.

Next, in step 108 the clamping assembly 70, along with loop 11 which the clamping assembly is holding, is raised until the loop 6 is positioned just above the sheaf 30. In one embodiment, the clamping assembly 70 may be raised a fixed amount, such as 5 mm, 10 mm, 20 mm, etc. In another embodiment, the clamping assembly 70 may be raised depending on the size/type of paperclip being attached to the sheaf. For example, larger sized paperclips can be raised more than a smaller sized paperclip without deforming. In yet another embodiment, the clamping assembly 70 can be raised an amount which depends on the thickness of the sheaf 30. This could be determined optically by a camera (not shown), for example.

In step 110, the clamping assembly 70, together with paperclip 2 is moved forward such that the loop is underneath sheaf 30, while loop 6 is above sheaf 30. Thus, as the paperclip 2 moves forward, the paperclip becomes partially affixed to the sheaf 30.

In step 112, after the paperclip has become partially affixed to the sheaf 30, the clamping assembly 70 releases the paperclip 2 and the clamping assembly 70 is opened wide enough for pusher 115 to fit in between the clamp assembly 70.

In step 114, paperclip pusher 115 is extended and pushes paperclip 2 fully onto sheaf 30. This fully secures paperclip 2 onto sheaf 30 such that the inner part of loop 11 is pressed against or near to the edge of sheaf 30.

In step 116, the pusher 115 is retracted to its original position. Further, the clamping assembly 70 is also returned to its original position, ready to retrieve another paperclip.

Figure 11:
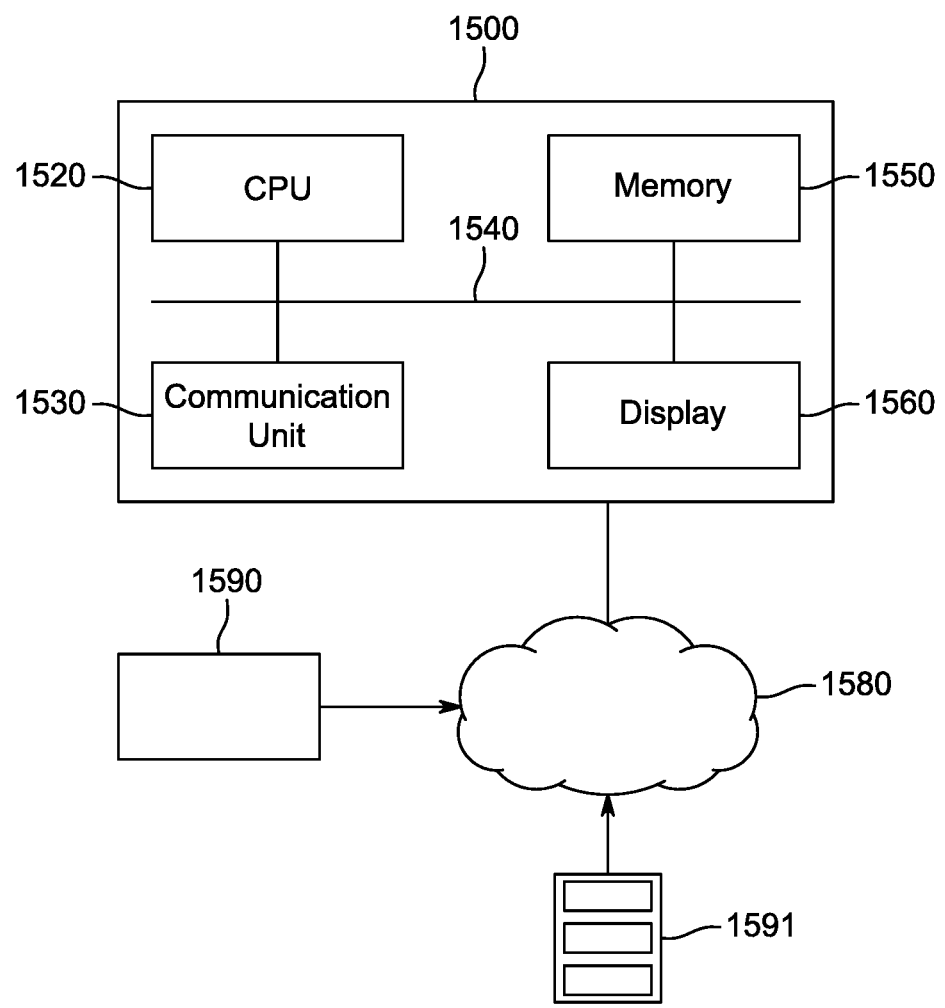
FIG. 11 shows a control circuit for controlling the paperclip attachment system according to an embodiment of the disclosure.

FIG. 11 illustrates an example of a control circuit 1500 that can be used in a scanner and used to control the paperclip attachment system 10, according to an embodiment of the present disclosure. The control circuit can be implemented on a computer, or scanner. The control circuit 1500 can control the scanner and elements of the paperclip attachment system 10, including the push-up bar 40, push-down bar 20, conveyor belt 50, paperclip clamping assembly 70, and paperclip dispensing system 60.

The control circuit 1500 may optionally be networked to another computing system 1590 via a network 1580, such as the Internet or a local area network (LAN) although network 1580 and computing system 1590 need not be part of the control circuit 1500. The control circuit 1500 can include a CPU 1520, memory 1550, communications unit 1530, display 1560, all connected via a bus 1540. It is noted that one or more control circuits 1500 can be used to implement various aspects of certain embodiments of the disclosure.

The control circuit 1500 can be implemented by one or more scanner's, or various forms of digital computers, such as laptops, desktops, workstations, servers, blade servers, mainframes, and other appropriate computers. The components shown here, their connections and relationships, and their functions, are meant to be examples only, and are not meant to limit embodiments of the disclosure described and/or claimed in this document.

Each of the components of the control circuit 1500 are interconnected using various busses and may be mounted on a common circuit board or in other manners as appropriate. The central processing unit 1520 can process instructions for execution within the control circuit, including instructions stored in the memory or on the storage device to display graphical information on a display. In other embodiments, multiple processors and/or multiple buses may be used, as appropriate, along with multiple memories and types of memory. Also, multiple control circuits may be interconnected.

The central processing unit 1520 may be implemented as an integrated circuit that includes separate and/or multiple analog and digital processors. Additionally, the CPU may be implemented using any of several architectures. For example, the processor may be an x86 processor, RISC (reduced instruction set computers) processor. The processor may coordinate with the other components of the device, such as control of user interfaces, applications run by the device, and wireless communication. Multiple processors or processors with multiple cores may also be used. The processor is primarily responsible for performing the functions discussed in this document, however, a GPU may also be used.

The processor may communicate with a user through a control interface and display interface coupled to a display. The display may be, for example, an LED (liquid crystal display) display, or other appropriate display technology. The display interface may comprise suitable circuitry for driving the display to present graphical and other information to a user. The control interface may receive commands from a user and convert them for submission to the processor. In addition, an external interface may be provided in communication with processor to enable near field communication with other devices. An external interface may provide, for example, for wireless and/or wired communication. Multiple interfaces may also be used.

Input to the control circuit 1500 may be done with a personal computer, server, or other computing device 1590.

The CPU 1520 operates according to a program stored in memory 1550. The CPU 1520 controls the communication unit 1530 and the display 1560. The program may be provided through the network 1580 such as the Internet, or provided by being stored in a computer-readable information storage medium such as a DVD-ROM or a USB memory.

The memory 1550 includes, for example, a memory device such as a RAM or a ROM and a hard disk drive. The memory 1550 stores the program. The memory also stores information or computational result input from each unit.

The communication unit 1530 can be a network card which is configured to communicate with other devices, such as a web server or other computers. The communication unit 1530 inputs information received from other devices into the CPU 1520 or the memory 1550 based on the control of the CPU 1520 and sends the information to other devices.

Bus 1540 is configured to send or receive data to/from the CPU 1520, memory 1550, the communication unit 1530, and the display 1560. For example, the CPU 1520 or memory 1550 is connected to the display 1560 through an expansion bus in the bus 1540.

The in-device memory can be composed of a DRAM. The in-device memory is connected to the CPU 1520 and the memory 1550 through the bus 1540. The high-speed memory is composed of, for example, a SRAM that is capable of higher speed access than the in-device memory.

The control circuit 1500, which controls a scanner, can be part of a document processing system. For example, documents which contain paperclips, can be input into the scanner, and once the documents are scanned/digitized and saved to an internal memory 1550 or external memory 1591, paperclips can be attached or re-attached to the documents. Once the documents are stored in memory, the documents could be processed or manipulated in any number of ways.

An example of an external memory 1591 could be another computer/server which is connected to the scanner directly or through a network. Further, the external memory 1591 could be cloud storage, for example. While FIG. 10 shows the external memory 1591 connected to the control circuit 1500 through network 1580, the external memory 1591 could also be directly connected to the control circuit 1500.

The document processing system could intake reams of documents, and scan each document and then attach paperclips to the documents without needing a human being to do so. The system could be used to digitize hospital records, for example.

What is claimed is:

1. A scanner comprising:
a paperclip dispensing system for holding and dispensing paperclips;
a paperclip clamping assembly adjacent to the paperclip dispensing system for retrieving paperclips from the paperclip dispensing system;
a conveyor belt located adjacent to the paperclip clamping assembly for feeding a sheaf of papers to the paperclip clamping assembly;
a push-up bar configured to apply an upwards force to the sheaf of papers and located adjacent to the conveyor belt;
a push-down bar configured to apply downwards force to the sheaf of papers and located adjacent to the conveyor belt; and
a control circuit for controlling the paperclip dispensing system, the paperclip clamping assembly, and the conveyor belt; wherein
the paperclip clamping assembly is configured to attach a paperclip onto the sheaf of papers on the conveyor belt; and
the push-up bar and the push-down bar are opposed to one another and operate to securely hold the sheaf of papers in place while the paperclip is being attached to the sheaf of papers.

2. The scanner according to claim 1, wherein the conveyor belt is configured to feed the sheaf of papers in between the push-up bar and the push-down bar.

3. The scanner according to claim 2, wherein the paperclip dispensing system comprises:
a paperclip cartridge for holding paperclips;
a paperclip tray positioned below the paperclip cartridge;
a piston;
a piston rod which is pushed by the piston; wherein
the piston rod is configured to push a lowest paperclip held in the paperclip cartridge onto the paperclip tray.

4. The scanner according to claim 3 wherein the paperclip clamping assembly comprises:
a first and second arm which are opposed to each other;
a first gripper attached to the first arm and a second gripper attached to the second arm;
wherein the first and second arms are configured to move back and forth in a clamp and release movement; and
wherein the first gripper and the second gripper are configured to grip a paperclip.

5. The scanner according to claim 4, wherein the paperclip clamping assembly further comprises:
a paperclip pusher configured to push the paperclip onto a sheaf of papers.

6. The scanner according to claim 5, wherein the paperclip clamping assembly is configured to move forwards and backwards along a first dimension, and up and down in a second dimension.

7. The scanner according to claim 6, wherein the first arm and the second arm of the paperclip clamping assembly are configured to spread apart so that the paperclip pusher can extend in between the first arm and second arm and push the paperclip onto the sheaf of papers.

8. A method of attaching a paperclip to a sheaf of papers for use in a scanner, comprising:
retrieving the paperclip with a paperclip clamping assembly;
advancing the paperclip clamping assembly toward the sheaf of papers;
holding the sheaf of papers securely in place by using a push-down bar and a push-up bar, which are opposed to one another to apply a securing force to the sheaf of papers;
opening the paperclip with the paperclip clamping assembly; and
pushing the opened paperclip onto the sheaf of papers.

9. The method of attaching a paperclip according to claim 8, further comprising:
dispensing the paperclip for the paperclip clamping assembly using a paperclip dispensing system which holds a plurality of paperclips.

10. The method of attaching a paperclip according to claim 8 wherein the paperclip clamping assembly, which is configured to move forwards and backwards along a first dimension, and up and down along a second dimension moves toward the sheaf of papers and positions a first loop of the paperclip underneath the sheaf of papers.

11. The method of attaching a paperclip according to claim 10 wherein the paperclip clamping assembly is used to open the paperclip, after positioning the first loop of the retrieved paperclip underneath the sheaf of papers, by lifting the paperclip upwards, thereby causing a second loop of the paperclip to open with respect to the first loop of the paperclip.

12. The method of attaching a paperclip according to claim 11, wherein the opened paperclip is pushed onto the sheaf of papers with a pusher.

13. The method of attaching a paperclip according to claim 12, further comprising:
opening the paperclip clamping assembly so that the pusher can extend towards and push the paperclip onto the sheaf of papers.

14. An apparatus for attaching a paperclip to a sheaf of papers, comprising:
a paperclip dispensing system for holding and dispensing paperclips;
a paperclip clamping assembly adjacent to the paperclip dispensing system for retrieving paperclips from the paperclip dispensing system;
a conveyor belt located adjacent to the paperclip clamping assembly for feeding a sheaf of papers to the paperclip clamping assembly;
a push-up bar configured to apply an upwards force to the sheaf of papers and located adjacent to the conveyor belt;
a push-down bar configured to apply downwards force to the sheaf of papers and located adjacent to the conveyor belt; and
a control circuit for controlling the paperclip dispensing system, the paperclip clamping assembly, and the conveyor belt; wherein
the paperclip clamping assembly is configured to attach a paperclip onto the sheaf of papers on the conveyor belt; and
the push-up bar and the push-down bar are opposed to one another and operate to securely hold the sheaf of papers in place while the paperclip is being attached to the sheaf of papers.

15. The apparatus according to claim 14, wherein the conveyor belt is configured to feed the sheaf of papers in between the push-up bar and the push-down bar.

16. The apparatus according to claim 15, wherein the paperclip dispensing system comprises:
a paperclip cartridge for holding paperclips;
a paperclip tray positioned below the paperclip cartridge;
a piston;
a piston rod which pushed by the piston; wherein
the piston rod is configured to push a lowest paperclip held in the paperclip cartridge onto the paperclip tray.

17. The apparatus according to claim 16 wherein the paperclip clamping assembly comprises:
a first and second arm which are opposed to each other;
a first gripper attached to the first arm and a second gripper attached to the second arm;
wherein the first and second arms are configured to move back and forth in a clamp and release movement; and
wherein the first gripper and the second gripper are configured to grip a paperclip.

18. The apparatus according to claim 17, wherein the paperclip clamping assembly further comprises:
a paperclip pusher configured to push a paperclip onto the sheaf of papers.

* * * * *